United States Patent
Schneider et al.

(10) Patent No.: US 11,408,519 B2
(45) Date of Patent: Aug. 9, 2022

(54) VALVE SYSTEM

(71) Applicant: BIERI HYDRAULIK AG, Liebefeld (CH)

(72) Inventors: Herrn Wolfgang Schneider, Thun (CH); Herr Ulrich Josi, Heimberg (CH)

(73) Assignee: BIERI HYDRAULIK AG, Liebefeld (CH)

(*) Notice: Subject to any disclaimer, the term of this patent is extended or adjusted under 35 U.S.C. 154(b) by 150 days.

(21) Appl. No.: 16/939,505

(22) Filed: Jul. 27, 2020

(65) Prior Publication Data

US 2021/0033205 A1 Feb. 4, 2021

(30) Foreign Application Priority Data

Jul. 29, 2019 (EP) .................................... 19188849

(51) Int. Cl.
- *F16K 11/04* (2006.01)
- *F16K 31/06* (2006.01)
- *F16K 1/42* (2006.01)
- *F16K 27/02* (2006.01)

(52) U.S. Cl.
CPC .......... *F16K 11/04* (2013.01); *F16K 31/0627* (2013.01); *F16K 1/42* (2013.01); *F16K 27/0263* (2013.01)

(58) Field of Classification Search
CPC ...... F16K 11/04; F16K 31/05; F16K 31/0627; F16K 1/42; F16K 27/0263; F16K 27/0272; F16K 31/0686; F16K 31/0693

USPC .................................................... 251/129.15
See application file for complete search history.

(56) References Cited

U.S. PATENT DOCUMENTS

| | | | | |
|---|---|---|---|---|
| 3,878,859 A * | 4/1975 | Grob | ................... | F16K 31/0693 251/129.02 |
| 4,524,803 A | 6/1985 | Stoll et al. | | |
| 4,574,844 A * | 3/1986 | Neff | ...................... | F16K 11/044 137/884 |
| 4,646,785 A * | 3/1987 | Ruedle | .................. | F16K 27/041 137/625.69 |
| 4,832,312 A * | 5/1989 | Linder | ................. | F02M 59/466 251/282 |
| 5,413,406 A * | 5/1995 | Nokubo | ................ | B60T 8/5037 303/119.2 |
| 5,746,413 A * | 5/1998 | Goloff | ................ | F01M 11/0458 417/466 |
| 6,869,060 B2 * | 3/2005 | Barber | ................ | F15B 13/0433 251/30.02 |

(Continued)

FOREIGN PATENT DOCUMENTS

DE 10 2012 023 750 5/2014

*Primary Examiner* — Seth W. Mackay-Smith
(74) *Attorney, Agent, or Firm* — Wenderoth, Lind & Ponack, L.L.P.

(57) ABSTRACT

A valve system has at least one actuated valve device (10) for controlling various fluid ports (15, 16, 17) of a valve housing (18). The valve housing has a receiving space (20) forming a bottom (22), into which the fluid ports (15, 16, 17) open and in which the valve device (10) is installed. The valve device (10) is in frontal contact with the bottom (22) of the receiving space (20) at least in a sector (26). At least during operation, this sector (26) is sealed with respect to the receiving space (20) by at least one sealing device.

14 Claims, 4 Drawing Sheets

(56) References Cited

U.S. PATENT DOCUMENTS

| | | | |
|---|---|---|---|
| 7,210,501 B2 * | 5/2007 | Neff | F16K 31/0696 |
| | | | 251/282 |
| 7,588,229 B2 * | 9/2009 | Eiser | B60T 8/363 |
| | | | 335/229 |
| 8,453,678 B2 * | 6/2013 | Neff | F16K 11/0712 |
| | | | 251/360 |
| 2006/0021664 A1 | 2/2006 | Katsuta et al. | |
| 2014/0175311 A1 | 6/2014 | Jamison | |
| 2014/0332093 A1 * | 11/2014 | Jamison | F16K 27/02 |
| | | | 137/315.11 |
| 2021/0033205 A1 * | 2/2021 | Schneider | F16K 11/044 |

\* cited by examiner

VALVE SYSTEM

FIELD OF THE INVENTION

The invention relates to a valve system having at least one actuated valve device for controlling various fluid ports of a valve housing. The valve housing has a receiving space forming a bottom, into which the fluid ports open and in which the valve device is installed.

BACKGROUND OF THE INVENTION

A generic valve system is known from DE 10 2012 023 750 B3. The valve device of the known system has a valve piston for actuating the individual fluid ports in the valve housing. The valve piston is guided in the valve housing for longitudinal motion in a hollow cylinder-shaped guide part controlled by a solenoid device. The guide part is arranged stationarily in the receiving space of the valve housing. Via connecting channels matching the fluid ports in the valve housing, the fluid ports open out of the guide part in the direction of the valve piston. The actuating solenoid device of the known valve device can be immobilized at the valve housing or valve block via a flange-shaped connecting plate or designed as a screw-in cartridge.

In practice, such known valve systems are not suitable for high pressure applications, especially with fluid pressures above 700 bar, because in typical valves the operating pressure is present in the actuator, resulting in service life problems with the typically welded pole tubes. Because of the thick walls resulting from the high pressure, the actuating force would in any case decrease considerably for the same solenoid size, because the pole surface decreases.

The pressure, which is usually also applied at the front end, results in high pressing forces. In a common valve design, where the pressure is present in a screw-in thread, dangerous unscrewing processes or even tearing-out processes at higher pressures tend to occur. For such conventional screw-in seat valves, the associated manual emergency override using a sealed pin would be very stiff at fluid pressures above 700 bar in the pole tube, resulting in an emergency override becoming impossible.

SUMMARY OF THE INVENTION

Based on this state of the art, the invention addresses the problem of achieving a favorable operating behavior having a high operational reliability while retaining the advantages of the known solutions, and to further improve these know solutions in such a way that a valve system is created, which can be used to safely control even extremely high operating pressures at the fluid ports.

A valve system according to this invention basically solves this problem. Because the valve device is in frontal contact with the bottom of the receiving space at least in a sector and in that, at least during operation, this sector is sealed with respect to the receiving space by at least one sealing device, a relatively large support surface of the valve device including its components is supported with respect to the bottom of the receiving space of the valve housing. Very high pressures at the fluid ports then can be reliably controlled based on the solution according to the invention. Owing to the surface support mentioned above, a relevant mutual sealing of fluid-conveying parts of the system is achieved in the area of the contact of the valve device with the bottom of the receiving space, relieving the other seals of the sealing device accordingly. The sealing device then can be reduced in terms of installation space, but still permit high-pressure applications without very large valve dimensions being required, which is out of the question anyway because of the usually limited installation space in valve housings or valve blocks.

In a preferred design of the valve system according to the invention, provision is made to form the sector by an end face of a first guide sleeve. Facing the bottom of the receiving space, the guide sleeve guides a valve piston of the valve device, and to arrange a first sealing device between the valve piston and the first guide sleeve. Because the end face of the first guide sleeve already has a sealing effect against the bottom of the receiving space, the seal acting between the valve piston and the first guide sleeve in this area can be moved there in a space-saving manner and can co-support the guide of the valve piston in the first guide sleeve.

Preferably, the first guide sleeve is mounted in a hollow cylindrical guide part in a floating manner. At least one second sealing device is arranged between the first guide sleeve and the guide part. A third sealing device is arranged between the front end of the guide part and the bottom of the receiving space. By enclosing the first guide sleeve by the hollow cylinder-like guide part, a further pressure-resistant reinforcement for the entire system is achieved. Very high fluid pressures then can be controlled. The guide part forms a kind of protective armoring, reducing the pressure at the first guide sleeve accordingly. Because of the floating mounting of the first guide sleeve in the guide part, the first guide sleeve can be pressed in the direction of the bottom of the receiving space under the influence of pressure against the relevant assignable fluid port. In addition to the aforementioned second sealing device, the third seal in the frontal area of the guide part provides a sealing effect in the edge area of the frontal contact between the guide sleeve and the guide part.

For a pressure-resistant design of the valve system providing an improved sealing effect, provision is furthermore preferably made that the valve piston is guided in a movable manner along a second guide sleeve, that a fourth sealing device is arranged between the valve piston and the second guide sleeve, and that a fifth sealing device is arranged between the second guide sleeve and the guide part.

Provision may also preferably be made that the second guide sleeve is also mounted in the guide part in a floating manner, that the guide part has the same inner diameter throughout its inside, and that further sealing devices are arranged between the guide part and the valve housing. The further sealing devices seal the fluid ports against each other in the area where they open into the receiving space of the valve housing. Because the second guide sleeve is also mounted in the guide part in a floating manner like the first guide sleeve, the stops of these guide sleeves can be on a bottom of the receiving space and on one of the end faces of one of the guide sleeves facing away from this bottom.

Where the term "mounted in a floating manner" is used in the context of the this description of the invention, it also includes embodiments in which the assigned guide sleeves are pressed in very slightly, i.e. the relevant guide sleeve is not displaced under the action of a spring as long as that part has not yet been installed or immobilized in the receiving space. That means, solutions still fall under the term "mounted in a floating manner" if they are designed in such a way that they are mounted to be moved at least under pressure. Instead of a guide sleeve that is "mounted in a floating manner" or that can be displaced in this sense, alternative designs of the valve system design are also conceivable, in which the guide sleeve is immobilized in its intended installation state.

The movement of the valve piston between the two guide sleeves is assisted by an energy storage device, preferably in the form of a compression spring arranged in the pressure chamber. One free end of the compression spring is supported on the first guide sleeve. The other free end of the compression spring is supported on the valve piston.

The valve system according to the invention can be used for two fluid ports in the valve housing, but also for another plurality of fluid ports, in particular in the form of three fluid ports. As the pressure on the relevant guide sleeve is relieved by the hollow cylinder-shaped guide part, no unwanted deformation occurs in the area of the valve seat. In this way achieving reliable operation of the valve piston and the control of the fluid ports via the control edges of the valve seats and obtained.

If preferably the guide sleeves are designed as identical parts, manufacturing costs can be reduced and errors in the assembly of the valve system can be prevented. The guide part having the same inner diameter throughout would also contribute to a reduction of costs.

Further advantageous embodiments of the valve system according to the invention include further sealing devices, the implementation of the valve device as a screw-in valve or cartridge valve and the actuation by a solenoid device.

Taken as a whole, the system according to the invention can be used to design a directional poppet valve as a complex unit or a directional poppet valve as a screw-in valve. Individually assignable valve seats can be used to depressurize the valve piston in both directions of travel, i.e. all fluid ports can be designed to withstand high pressure without exposing the pole tube or the pole-tube sleeve of the actuating solenoid device to fluid pressures. This arrangement permits the combination of a high-pressure screw-in valve with a non-welded pole tube sleeve, as the tube sleeve has a magnetic bypass which is saturated at a certain magnetic flux density. Because the pole tube sleeve of the solenoid system is not subjected to any pressure, the sleeve can also be designed having thin walls and the resulting increased pole surface and a stepped solenoid armature can significantly increase the actuating force for the valve system.

Other objects, advantages and salient features of the present invention will become apparent from the following detailed description, which, taken in conjunction with the drawings, discloses preferred embodiments of the present invention.

BRIEF DESCRIPTION OF THE DRAWINGS

Referring to the drawings that form a part of this disclosure and that are not to scale.

DETAILED DESCRIPTION OF THE INVENTION

Figure 1:
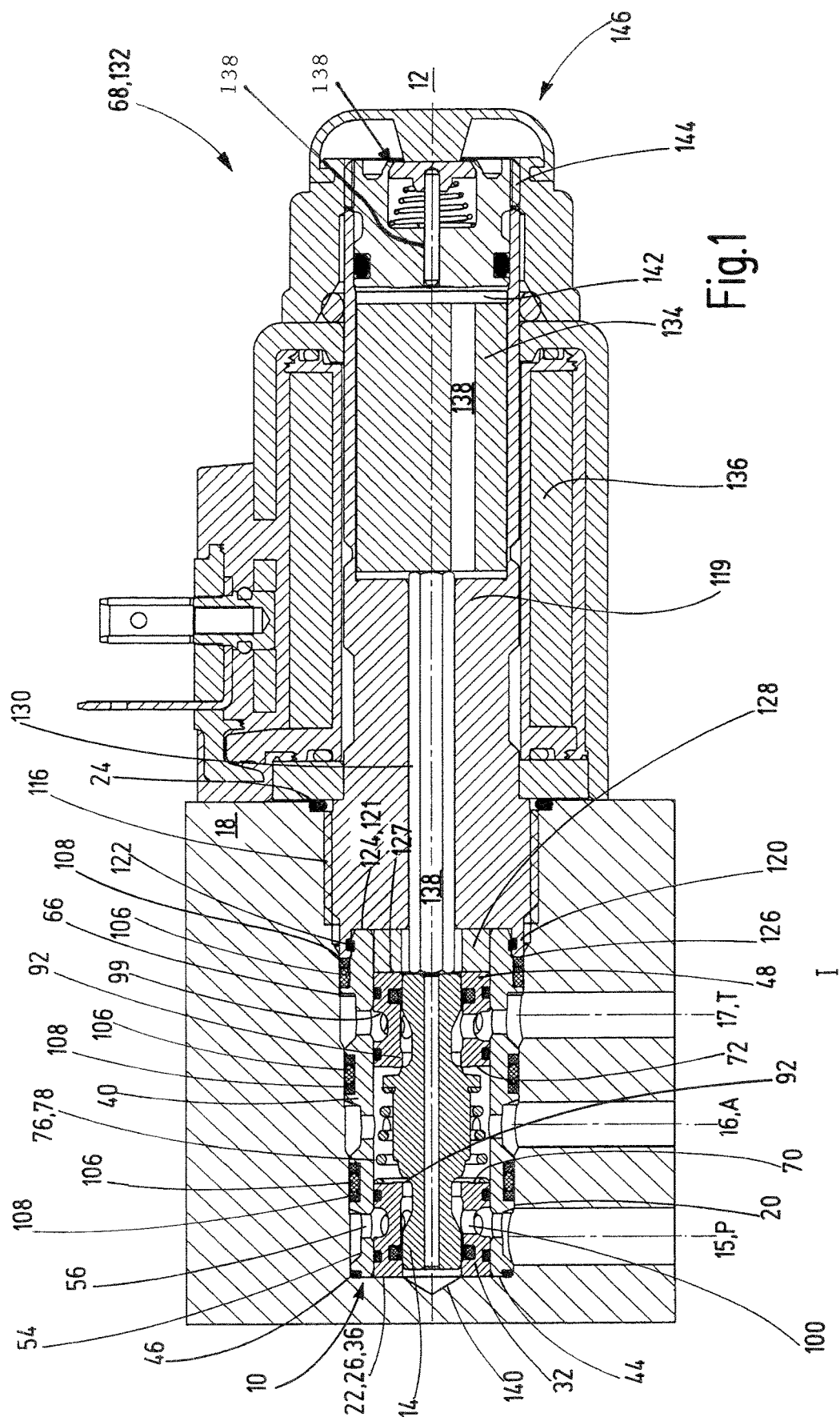
FIG. 1 is a side view in section of a valve system according to a first exemplary embodiment of the invention.
Figure 2:
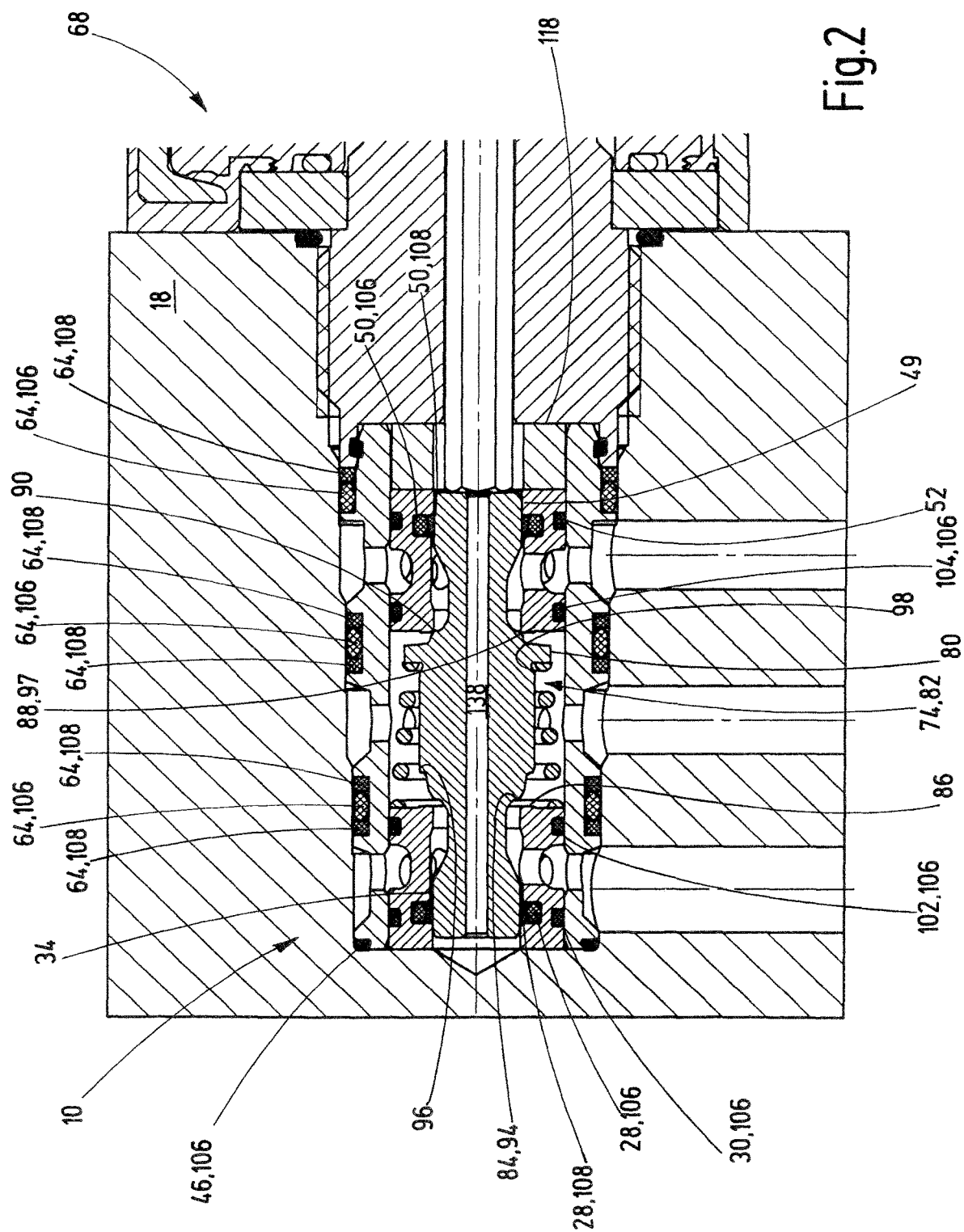
FIG. 2 is an enlarged (compared to FIG. 1) partial side view in section of the area of the valve system designated by I in FIG. 1.

FIG. 1 shows a valve system according to the invention, which has at least one operable valve device 10 having a valve piston 14 movable along a longitudinal axis 12 of the valve system for controlling three different fluid ports 15, 16, 17 of a valve housing 18. The valve housing 18 co-delimits an accommodation space 20, into which the fluid ports 15, 16, 17 open. The wall of valve housing 18, which is oriented transversely to the longitudinal axis 12, forms the receiving space bottom 22. Starting from an opening 24 of the valve housing 18 opposite from the bottom 22 of the receiving space 20, the valve device 10 is inserted into the receiving space 20 of the valve housing 18 in such a way that it is in frontal contact with the bottom 22 of the receiving space 20 at least in a sector 26. The sector 26 is sealed off from the receiving space by at least one sealing device or seal 28, 30, 46 at least during the operation of the valve system.

A first guide sleeve 32, which is oriented coaxially with the longitudinal axis 12 of the valve system and which guides the valve piston 14 of the valve system 10 at its end area 34 facing the bottom 22 of the receiving space 20 in an encompassing manner, is inserted in the receiving space 20 as part of the valve device 10. The sector 26 is formed by an end face 36 of the first guide sleeve 32 facing the bottom 22 of the receiving space 20. A first sealing device or seal 28 is arranged in an annular groove on the inner circumference of the first guide sleeve 32, which sealing device encompasses the valve piston 14 and seals the first guide sleeve 32 with respect to the valve piston 14.

A hollow cylinder-shaped guide part 40 is inserted in the valve housing 18, as part of the valve device 10. The guide part 40 encompasses the first guide sleeve 32, which is mounted in the guide part 40 in a floating manner. A second sealing device or seal 30 is arranged in a further annular groove at the outer circumference of the first guide sleeve 32, which second sealing device 30 encompasses the first guide sleeve 32 and seals it with respect to the guide part 40. At its end face 44 facing the bottom 22 of the receiving space 20, the guide part 40 has a reduction of its outer diameter, which reduction is used to accommodate a third sealing device 46. The third sealing device or seal 46 encompasses the guide part 40 and seals the guide part 40 with respect to the receiving space 20 in the axial and the radial direction. In this exemplary embodiment, the free end faces 36, 44 of both the first guide sleeve 32 and the guide part 40, respectively, rest against the bottom 22 of the valve housing 18. However, there is also the option of lifting the guide part 40 a predeterminable axial distance from the bottom 22, which requires a radial seal on the outer circumference of the guide part 40 with respect to the valve body 18 in this area and the third frontal seal 46 can be omitted (not shown).

A second guide sleeve 48 is provided in the valve housing 18 as part of the valve device 10, in which the end area 49 of the valve piston 14 facing away from the bottom 22 of the receiving space 20 is movably guided. A fourth sealing device or seal 50 is arranged in an annular groove of the second guide sleeve 48, which sealing device encompasses the valve piston 14 and seals the second guide sleeve 48 with respect to the valve piston 14. A fifth sealing device or seal 52 is arranged in a recess at the outer circumference of the second guide sleeve 48, which fifth sealing device encompasses the second guide sleeve 48 and seals it with respect to the guide part 40.

The guide part 40, which has a constant internal diameter throughout, comprises the second guide sleeve 48, which, just like the first guide sleeve 32, is mounted in the guide part 40 in a floating manner based on its assigned sealing system.

In areas where respective fluid ports 15, 16, 17 open from the valve housing 18 into the receiving space 20, the guide part 40 has one circumferential groove 54 each. Several passages 56 are provided in the guide part 40 for the fluid of the fluid ports 15, 16, 17. In the recesses on the outer circumference of the guide part 40, viewed in the direction of the longitudinal axis 12, between the groove 54 for a first fluid port 15 and the groove 54 for a second fluid port 16 and between the groove 54 for the second fluid port 16 and the groove 54 for the third fluid port 17, there are further respective sealing devices or seals 64, which seal the guide part 40 with respect to the valve housing 18 and the fluid ports 15, 16 with respect to each other in the area where they open into the receiving space 20. At the outer circumference of the guide part 40, on the end facing away from the bottom 22 of the receiving space 20 outside its adjacent groove 54, a projection 66 circumferential around the guide part 40 is provided for the third fluid port 17. The end of third fluid port 17 facing away from the bottom 22 of the receiving space 20 adjoins a further sealing devices or housing seals 64, which seals the guide part 40 with respect to the valve housing 18 and with respect to components of an actuating device 68 for the valve device 10.

The end face 70 of the first guide sleeve 32 facing away from the bottom 22 of the receiving space 20 and the end face 72 of the second guide sleeve 48 facing towards the bottom 22 of the receiving space 20 co-delimit a pressure chamber 74 in the guide part 40. In pressure chamber 74, pressure from at least one of the fluid ports 15, 16, 17 is present in every travel position of the valve piston 14.

An energy storage device 76 in the form of a spiral-shaped compression spring 78 is arranged in the pressure chamber 74. One end of compression spring 78 rests against the end face 70 of the first guide sleeve 32 facing away from the bottom 22 of the receiving space 20. The other end of compression spring 78 rests on a projection 80 circumferential around the valve piston 14. The valve piston 14 extends through the compression spring 78.

The diameter of the valve piston 14 is expanded in its central area 82. The end of that piston expansion facing the bottom 22 of the receiving space 20 forms a first control edge 84, which interacts with a part of the end face 70 of the first guide sleeve 32 facing away from the bottom 22 of the receiving space 20 to form a first valve seat 86. An end of the diameter expansion in the central area 82 of the valve piston 14 facing away from the bottom 22 of the receiving space 20 forms a second control edge 88, which interacts with a part of the end face 72 of the second guide sleeve 48 facing the bottom 22 of the receiving space 20 to form a second valve seat 90.

The first guide sleeve 32 has a constant inner diameter, except for an annular part 92 having a reduced inner diameter, which is adjoined by the first valve seat 86 in the direction of the valve piston 14. The end area 34 of the valve piston 14, which is guided by the first guide sleeve 32 and which faces the bottom 22 of the receiving space 20 and is of cylindrical design, adjoins in the direction of its central area 82 the central area 82 of the valve piston 14. Central area 82 is enlarged in diameter compared to the end area 34, in an area of reduced diameter in the manner of a concave recess of the valve piston 14. Starting from the cylindrical end area 34 of the valve piston 14, the area of the reduced diameter first tapers conically, followed by a cylindrical area of constant diameter, after which the valve piston 14 widens towards the central area 82, forming at least two steps 94, 96. A first step 94 forms the first control edge 84 of the valve piston 14, and a second step 96 merges into the constant diameter of the central area 82.

The design on the other, opposite end of the valve piston 14 having the second guide sleeve 48 is selected accordingly. Thus, the half of the valve piston 14 facing away from the bottom 22 of the receiving space 20 is designed to match its half facing the bottom 22, with the exception of the projection 80 where the compression spring 78 engages. Projection 80 has a larger diameter projecting radially than the central area 82 of the valve piston 14 between a further first stage 97 in the form of the second control edge 88 and a further second stage 98.

For the high-pressure application preferred here, the travel distance of the valve piston 14 between its two end stroke positions, at which it approaches the first valve seat 86 and the second 90 valve seat, respectively, is extremely small in the present exemplary embodiment and is between 0.4 mm and 2 mm, preferably 0.6 mm.

The first and second sleeve guides 32, 48 are formed as identical parts. Each guide sleeve 32, 48 has a circumferential groove 99 on its outer circumference, in which several passages 100 are provided for the fluid of the fluid ports 15, 16, 17. These passages 100 are essentially congruent with the radially arranged fluid passages 56 in the guide part 40, preventing any turbulence in the fluid guide.

The first sealing device 28 and the second 30 sealing device are provided in the first guide sleeve 32 on the end outside its adjacent groove 99 facing the bottom 22 of the receiving space 20. In an annular groove on the outer circumference of the first guide sleeve 32, on the end facing away from the bottom 22 of the receiving space 20 outside its adjacent groove 99, a sixth sealing device or seal 102 is arranged, which encompasses the first guide sleeve 32 and seals it with respect to the guide part 40.

The fourth sealing device 50 and the fifth sealing device 52 are provided in the second guide sleeve 48 on the end outside its adjacent groove 99 facing the bottom 22 of the receiving space 22. In an annular groove on the outer circumference of the second guide sleeve 48, on the end facing the bottom 22 of the receiving space 20 outside its adjacent groove 99, a seventh sealing device or seal 104 is arranged, which encompasses the second guide sleeve 48 and seals it with respect to the guide part 40. There, the fifth sealing device 52 and the seventh 104 sealing device form the floating bearing points for the second guide sleeve 48. If the description of the invention refers to sealing devices 28, 30, 46, 50, 52, 64, 102, 104, which seal the guide part 40 with respect to the valve housing 18 and the two guide sleeves 32, 48 with respect to the valve piston 14, these are combined systems which, in addition to their sealing function, also perform a support and guide function.

Each of the first to sixth and the further sealing devices or seals 28, 30, 46, 50, 52, 64, 102, 104 have one sealing ring 106 each. In the first sealing device 28 and the fourth 50 sealing device, a support and guide ring 108 is accordingly connected to the relevant sealing ring 106 in the direction of the longitudinal axis 12, i.e. inwards, and is then arranged between the valve piston 14 and the relevant sealing ring 106. In the case of the further sealing device 64, which is arranged between the groove 54 for the first fluid port 15 and the groove 54 for the second fluid port 16, and the further sealing device 64, which is arranged between the groove 54 for the second fluid port 16 and the groove 54 for the third fluid port 17, such a support and guide ring 108 adjoins the relevant sealing ring 106 on both ends in the direction of the longitudinal axis 12. At the further sealing device 64, which is arranged between the circumferential projection 66 of the guide part 40 and the actuating device 68, only one support and guide ring 108 is adjacent to the sealing ring 106 in the direction of the longitudinal axis 12 towards the actuating device 68.

The sealing devices 28, 30, 46, 50, 52, 64, 102, 104 can basically be divided into three groups, each of which is essentially coaxial with the longitudinal axis 12. The first group includes the first sealing device 28 and the fourth sealing device 50. The second group includes the second sealing device 30, the fifth sealing device 52, the sixth sealing device 102 and seventh sealing device 104. The third group is formed by the other sealing devices 64 described above, which radially encompass the guide part 40. The group structure described above forms a kind of counter bearing in view of the high dynamic pressure loads that occur. Those loads act on the components of the valve system in the form of the valve piston 14, the guide sleeves 32, 48, the guide part 40 and the valve housing 18.

The valve device 10 is immobilized in the receiving space 20 by the actuating device 68 via a screw-in section 116 in the valve housing 18 in the manner of a screw-in cartridge. For this purpose, a circumferential projection 120 extending away from the end face 118 of the pole tube 119 facing the bottom 22 of the receiving space 20 in the direction of the bottom 22 comprises the end area 121 of the guide part 40 facing away from the bottom 22 of the receiving space 20 with the interposition of a further sealing ring 122. The end face 118 of the pole tube 119 facing the bottom 22 of the receiving space 20 comes into contact with the end face 124 of the guide part 40 facing away from the bottom 22. The end face 126 of the projection 120 of the pole tube 119 facing the bottom 22 of the receiving space 20 defines a space with a further sealing device or seal 64 on the outer circumference of the guide part 40 nearest to the actuating device 68.

A disc-shaped spacer 128, which is penetrated by an actuating rod 130 of the actuating device 68 acting on the valve piston 14, is arranged, encompassed by the guide part 40, between the end face 118 of the pole tube 119 facing the bottom 22 of the receiving space 20 and the end face 127 of the second guide sleeve 48 facing away from the bottom 22 of the receiving space 20.

The actuating device 68 has a solenoid 132 having a solenoid armature 134. When a coil device 136 of the actuating device 68 is energized, solenoid armature 134 acts as a pressing magnet on the actuating rod 130 in the direction of the bottom 22 of the receiving space 20.

A pressure compensation channel 138 passes through the valve piston 14, the actuating rod 130, the solenoid armature 134 and the emergency manual override 146 (see FIG. 1) and connects a blind bore 140 made in the base 22 of the receiving space 20 to that part of an armature space 142, which faces away from the base 22 of the receiving space 20. The end 144 of the pole tube 119 facing away from the bottom 22 of the receiving space 20 is closed by an emergency manual override 146 inserted into the pole tube 119. Pole tube 119 is not sealed in the exemplary embodiment. In that way, it creates a pressure balance with the environment, even if there are minimal leakages in the sealing system, i.e., no dangerous pressure can ever build up in the pole tube.

Above all, owing to this design, ambient pressure also reaches the sealed sector 26 of receiving space 20. In that way, even if the guide sleeves 32 are not attached in the guide part 40, they will remain in place even if the pressure in pressure chamber 74 drops to near ambient pressure. Instead of a solenoid device 68, a manually operated lever mechanism (not shown) can also be used, which acts on the valve piston 14.

A great advantage of the system solution in accordance with the invention is therefore that pressure supply devices, load devices, tank devices and return devices can be connected to any of the fluid ports 15, 16, 17.

In this exemplary embodiment, the first fluid port 15 is connected to a pressure supply P, the second fluid port 16 is connected to a utility port or a load port A, and the third fluid port 17 is connected to a tank port or return port T. Overall, the port assignment has been selected such that the valve piston 14 is always moved in the direction of a stop in the form of its two opposite valve seats 86, 90 with force retention, ensuring the sealing effect, especially at the very high pressures (>700 bar) mentioned here. For the sake of completeness, it should be noted that the pin of the emergency manual override 146 may also be sealed against the environment if no hydraulic leakage is to be expected. Similarly, in such a design, the pressure in the depressed bottom can be relieved by a hydraulic port/channel in the depressed bottom. If the guide sleeves are attached, e.g. by laser welding, the relief pressure may be higher than the lowest pressure expected in operation in the space 74. In this way, hydraulic control can also be implemented by a cone that does not have a drilled hole. The guide sleeves can be pressed in, as mentioned above, to prevent them from moving in the not yet completely installed state. The attachment can be effected by a laser weld seam, solder or adhesive or similar means. An advantage of attaching the guide sleeves in the guide part 40 is that the guide part 40 elongates due to the pressure in the receiving space and thus loosening is inhibited, in particular if material creep reduces the thread assembly pre-tensioning force. This elongation has not been required so far, but could prove necessary at even higher pressures or for special materials. Part of the hydraulic force is also absorbed by the guide sleeves in the guide section, and the force on the bolt connection and the depressed bottom is reduced. A further advantage of attachment is that the pressure at the depressed bottom may be somewhat higher, and the guide sleeves cannot shift inwards.

Figure 3:
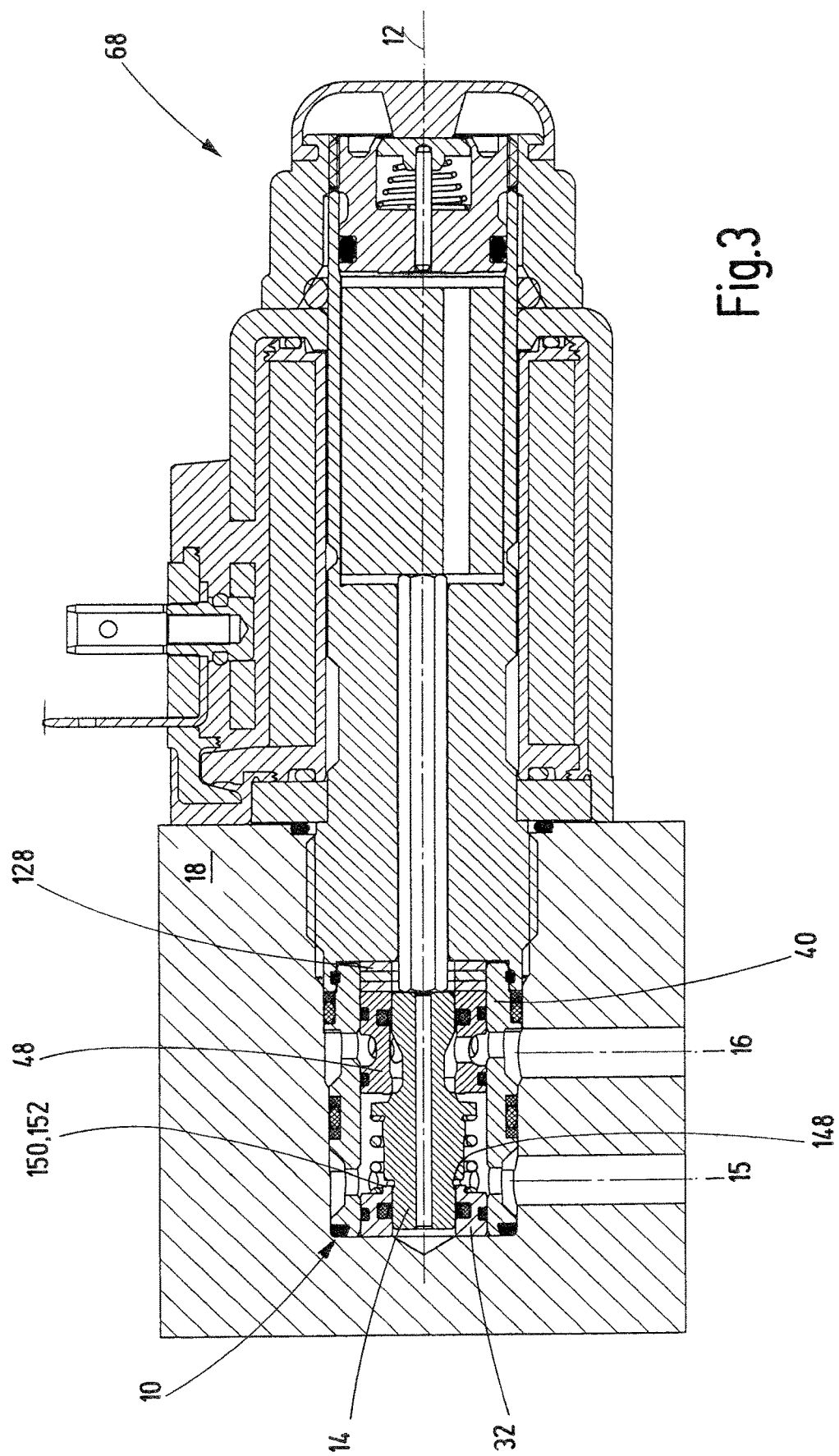
FIG. 3 is a side view in section of a valve system according to a second exemplary embodiment of the invention.

FIG. 3 shows a second exemplary embodiment of the valve system according to the invention, which differs from the exemplary embodiment according to FIG. 1 as described below.

The cylindrical end area 34 of the valve piston 14 facing the bottom 22 of the receiving space 20 merges directly into the piston's central cylindrical area 82, forming a single stage 148, resulting in the valve piston 14 of the second exemplary embodiment being shorter than that of the first exemplary embodiment. The half of the valve piston 14 facing away from the bottom 22 of the receiving space 20, however, largely corresponds to that of the first exemplary embodiment.

The first guide sleeve 32 is axially shortened in comparison with the solution described above and is designed as a ring, which has a projection 150 extending away from its end face 70 facing away from the bottom 22 of the receiving space 20 in the direction of the longitudinal axis 12. The end face 152 of projection 150 is a stop for the step 148 of the valve piston 14. A first sealing device or seal 28 is arranged in an annular groove on the first guide sleeve 32. The second sealing device or seal 30 is arranged in a further annular groove at the outer circumference of the first guide sleeve 32.

There are now two different fluid ports 15, 16 in the valve housing 18. The guide part 40 has only one groove 54 each with passages 56 for the fluid of the fluid ports 15, 16 in the areas where the two fluid ports 15, 16 enter the receiving space 20. In addition, three washers are arranged as spacers 128, encompassed by the guide part 40, between the end face 118 of the pole tube 119 facing the bottom 22 of the receiving space 20 and the end face 127 of the second guide sleeve 48 facing away from the bottom 22 of the receiving space 20.

Figure 4:
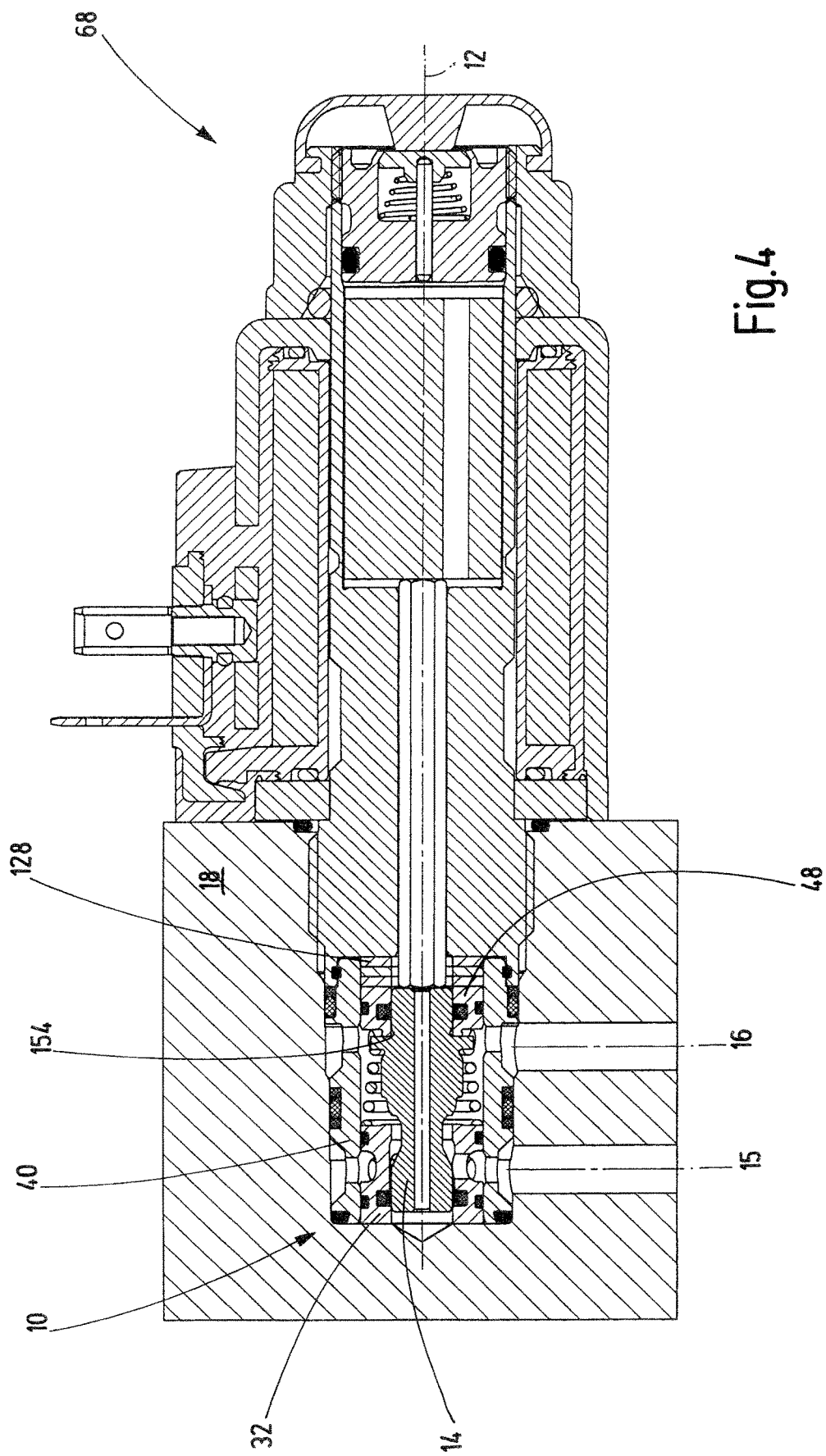
FIG. 4 is a side view in section of a valve system according to a third exemplary embodiment of the invention.

FIG. 4 shows a third exemplary embodiment of the valve system according to the invention, which differs from the exemplary embodiment according to FIG. 1 as described below.

The constant diameter at the end region 49 of the valve piston 14 facing away from the base 22 merges directly into its central area 82, forming the projection 80 for supporting the valve spring 78. The valve piston 14 of the third exemplary embodiment is shorter than that of the first exemplary embodiment. The half of the valve piston 14 facing the bottom 22 of the receiving space 20 largely corresponds to that of the first exemplary embodiment.

The second guide sleeve 48 is now designed as a ring, which has a stop 154 for the projection 80 of the valve piston 14, on which the valve compression spring 78 rests. The stop extends from its end face 72 facing the bottom 22 of the receiving space 20 in the direction of the longitudinal axis 12. A fourth sealing device 50 or seal is arranged in an annular groove on the first guide sleeve 32. The fifth sealing device or seal 52 is arranged in a further annular groove at the outer circumference of the first guide sleeve 32, as in the solution according to FIG. 1.

With regard to the fluid ports 15, 16 and the spacers 128, the third exemplary embodiment conforms to the second exemplary embodiment. In both the second and the third exemplary embodiments, actuating the solenoid system 68 moves the valve piston 14 either to its open position connecting the fluid ports 15, 16 to each other or to its closed position separating them.

While various embodiments have been chosen to illustrate the invention, it will be understood by those skilled in the art that various changes and modifications can be made therein without departing from the scope of the invention as defined in the claims.

The invention claimed is:

1. A valve system, comprising:
   a valve housing having first and second fluid ports and having a receiving space with a bottom, the first and second fluid ports opening into the receiving space;
   a valve device installed in the receiving space and in frontal contact with at least a sector of the bottom of the receiving space, the valve device having a valve piston;
   a first guide sleeve of the valve device being in the receiving space and having an end face forming the sector of the bottom and facing the bottom, the valve piston being located in and movably guided by the first guide sleeve;
   a first seal between the valve piston and the first guide sleeve;
   a hollow cylindrical guide part of the valve device being in the receiving space and receiving the first guide sleeve in the hollow cylindrical guide part in a floating manner;
   a second seal being between the first guide sleeve and the hollow cylinder guide part, the first and second seals sealing the sector at least during operation of the valve device; and
   a third seal being between a front end of the hollow cylindrical guide part and the bottom of the receiving space.

2. A valve system according to claim 1 wherein
   the valve piston is also being located in and movably guided by a second guide sleeve of the valve device in the receiving space;
   a fourth seal is between the valve piston and the second guide sleeve; and
   a fifth seal is between the second guide sleeve and the hollow cylindrical guide part.

3. A valve system according to claim 2 wherein
   the second guide sleeve is mounted in the hollow cylindrical guide part in a floating manner, the hollow cylindrical guide part having a constant inner diameter throughout an inside thereof;
   housing seals are between the hollow cylindrical guided and the valve housing sealing the first fluid port from the second fluid port in areas where the first and second fluid ports open into the receiving space of the valve housing.

4. A valve system according to claim 2 wherein
   facing end faces of the first and second guide sleeves co-delimit a pressure chamber having pressure from at least one of the first and second fluid ports in every travel position of the valve piston.

5. A valve system according to claim 4 wherein
   an energy store is in the pressure chamber, has one end engaged against the first guide sleeve and an opposite end engaged against the valve piston.

6. A valve system according to claim 5 wherein
   the energy store is a compression spring.

7. A valve system according to claim 2 wherein
   the valve piston comprises a first control edge interacting with one of the first guide sleeve or the second guide sleeve.

8. A valve system according to claim 2 wherein
   the valve housing comprises a third fluid port; and
   the valve piston has first and second control edges interacting with the first and second guide sleeves.

9. A valve system according to claim 8 wherein
   the first and second guide sleeves have identical structures.

10. A valve system according to claim 2 wherein
    further seals are between the first and second guide sleeves and the hollow cylindrical guide part in a plane transverse to a direction of travel of the valve piston; and
    a housing seal is between the hollow cylindrical guide part and the valve housing in the plane.

11. A valve system according to claim 2 wherein
    the valve device is actuatable in the receiving space by an actuator cartridge into the valve housing.

12. A valve system according to claim 11 wherein
    the actuator cartridge comprises an energizable actuating magnet and a spacer between a pole tube and the second guide sleeve, an actuating rod of the actuating magnet acting on the valve piston and extending through the spacer.

13. A valve system according to claim 12 wherein
    a pressure compensation channel extends through the valve piston, the actuating rod, a magnet armature of the actuator cartridge and an emergency manual override of the actuator cartridge, the pressure compensation channel connecting a blind bore in the bottom of the receiving space, an armature space of the actuator cartridge being on an end of the magnet armature facing away from the bottom of the receiving space.

14. A valve system according to claim 13 wherein an end of the pole tube facing away from the bottom of the receiving space being closed by the emergency manual override inserted in the pole tube.

\* \* \* \* \*